United States Patent
Yamamoto et al.

(10) Patent No.: US 12,463,374 B2
(45) Date of Patent: Nov. 4, 2025

(54) WIRING MEMBER AND METHOD FOR MANUFACTURING WIRING MEMBER

(71) Applicant: Sumitomo Wiring Systems, Ltd., Yokkaichi (JP)

(72) Inventors: Hironobu Yamamoto, Yokkaichi (JP); Toshinari Kobayashi, Yokkaichi (JP); Kyungwoo Kim, Yokkaichi (JP); Yukitoshi Terasaka, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 273 days.

(21) Appl. No.: 18/000,575

(22) PCT Filed: May 18, 2021

(86) PCT No.: PCT/JP2021/018814
§ 371 (c)(1),
(2) Date: Dec. 2, 2022

(87) PCT Pub. No.: WO2021/246163
PCT Pub. Date: Dec. 9, 2021

(65) Prior Publication Data
US 2023/0216237 A1    Jul. 6, 2023

(30) Foreign Application Priority Data

Jun. 3, 2020    (JP) ................................. 2020-096928

(51) Int. Cl.
| | |
|---|---|
| *H01R 13/52* | (2006.01) |
| *H01R 13/58* | (2006.01) |
| *H01R 43/00* | (2006.01) |

(52) U.S. Cl.
CPC ..... *H01R 13/5208* (2013.01); *H01R 13/5845* (2013.01); *H01R 43/005* (2013.01)

(58) Field of Classification Search
CPC ............ H01R 13/5208; H01R 13/5845; H01R 43/005; H01R 13/5205; H01R 13/504;
(Continued)

(56) References Cited

U.S. PATENT DOCUMENTS 5,580,264 A * 12/1996 Aoyama ............ H01R 13/5208
439/604
2017/0263350 A1    9/2017  Oka et al.
(Continued)

FOREIGN PATENT DOCUMENTS

| EP | 1204173 A2 * | 5/2002 | ......... H01R 13/5205 |
| EP | 2400600 A1 * | 12/2011 | ........... H01R 13/504 |

(Continued)

OTHER PUBLICATIONS

International Search Report, Application No. PCT/JP2021/018814, mailed Aug. 10, 2021.

*Primary Examiner* — Travis S Chambers
(74) *Attorney, Agent, or Firm* — Honigman LLP (57) ABSTRACT

An object of the present disclosure is to provide a technique for easily suppressing the intrusion of a resin into a cavity. A wiring member includes: a connector housing provided with a cavity; an electric wire in which one end portion is housed in the cavity and the other end portion extends outward from an opening portion of the cavity; a sealing component that is attached to the connector housing or the electric wire to at least partially close off a gap between the connector housing and the electric wire in the opening portion of the cavity; a resin molded part that covers a portion extending from a rear end portion of the connector housing to a position of an intermediate portion of the electric wire on the other end portion side relative to a portion provided with the sealing component.

5 Claims, 6 Drawing Sheets

(58) Field of Classification Search
CPC ............... H01R 13/562; B29L 2031/36; B29C 45/14549; B29C 45/14639; H02G 1/14; H02G 3/04; H02G 15/02
See application file for complete search history.

(56) References Cited

U.S. PATENT DOCUMENTS

2018/0154847 A1    6/2018    Oka et al.
2018/0281707 A1   10/2018   Oka et al.

FOREIGN PATENT DOCUMENTS

| EP | 2525443 A1 | * | 11/2012 | ............... B60L 53/16 |
| JP | 2002134220 A | * | 5/2002 | ....... B29C 45/14639 |
| JP | 2005327570 A | * | 11/2005 | ......... H01R 13/5208 |
| JP | 2015-220163 A | | 12/2015 | |
| WO | WO-2010050336 A1 | * | 5/2010 | ......... H01R 13/5208 |
| WO | 2013-021989 A1 | | 2/2013 | |
| WO | WO-2014003042 A1 | * | 1/2014 | ........... H01R 13/405 |
| WO | WO-2014010692 A1 | * | 1/2014 | ........... H01R 13/405 |

\* cited by examiner

WIRING MEMBER AND METHOD FOR MANUFACTURING WIRING MEMBER

CROSS-REFERENCE TO RELATED APPLICATIONS

This application is the U.S. national stage of PCT/JP2021/018814 filed on May 18, 2021, which claims priority of Japanese Patent Application No. JP 2020-096928 filed on Jun. 3, 2020, the contents of which are incorporated herein.

TECHNICAL FIELD

The present invention relates to a wiring member and a method for manufacturing the wiring member.

BACKGROUND

International Publication No. 2013/021989 discloses a technique for preventing intrusion of a resin into a terminal piece hole when injection molding a resin coating around a connector. According to International Publication No. 2013/021989, the intrusion of resin into the terminal piece hole is prevented by setting the ratio of the wall area to the entire area of the terminal piece hole to 0.5 to 20 and setting the melt viscosity of the resin to be used in the injection molding to 0.5 to 200 Pa·s.

However, in the technique described in International Publication No. 2013/021989, only combinations of a connector housing and resin satisfying the foregoing numerical values can be used.

In view of this, an object of the present disclosure is to provide a technique for easily suppressing the intrusion of a resin into a cavity.

SUMMARY

A wiring member of the present disclosure is a wiring member that includes: a connector housing provided with a cavity; an electric wire in which one end portion is housed in the cavity and the other end portion extends outward from an opening portion of the cavity; a sealing component that is attached to the connector housing or the electric wire to at least partially close off a gap between the connector housing and the electric wire in the opening portion of the cavity; and a resin molded part that covers a portion extending from a rear end portion of the connector housing to a position of an intermediate portion of the electric wire on the other end portion side relative to a portion provided with the sealing component.

Advantageous Effects of Invention

According to the present disclosure, it is easy to suppress the intrusion of a resin into a cavity.

DETAILED DESCRIPTION OF PREFERRED EMBODIMENTS

First, embodiments of the present disclosure will be listed and described.

A wiring member of the present disclosure is as described below.

First Aspect

In a first aspect, a wiring member includes: a connector housing provided with a cavity; an electric wire in which one end portion is housed in the cavity and the other end portion extends outward from an opening portion of the cavity; a sealing component that is attached to the connector housing or the electric wire to at least partially close off a gap between the connector housing and the electric wire in the opening portion of the cavity; and a resin molded part that covers a portion extending from a rear end portion of the connector housing to a position of an intermediate portion of the electric wire on the other end portion side relative to a portion provided with the sealing component. Since the sealing component at least partially closes off the gap between the connector housing and the electric wire in the opening portion of the cavity, it is easy to suppress the intrusion of a resin into the cavity through the opening portion of the cavity when molding the resin molded part.

Second Aspect

In a second aspect, the wiring member according to the first aspect, the sealing component may include a semi-tubular first member that covers the electric wire from one side and a semi-tubular second member that covers the electric wire from another side. Accordingly, the sealing component can be attached to the electric wire from lateral sides, so that it is easy to attach the sealing component to the electric wire.

Third Aspect

In a third aspect, the wiring member according to the first or the second aspect, the sealing component may include an insertion part provided with a hole in a plate-like part through which the electric wire is passed, the hole may be formed to be smaller than the cavity, and the plate-like part may be formed to be larger than the cavity and positioned on the other end portion side of the electric wire relative to the opening portion of the cavity. Accordingly, since the hole is formed to be smaller than the cavity, the resin is unlikely to intrude into a space between the hole and the electric wire. In addition, since the plate-like part is formed to be larger than the cavity and is positioned on the other end side of the electric wire relative to the opening portion of the cavity, the entrance to the hole is distanced from the opening portion of the cavity. Accordingly, even if the resin intrudes into the space between the hole and the electric wire, the resin is unlikely to reach the cavity.

Fourth Aspect

In a fourth aspect, the wiring member according to any one of the first to the third aspects, a gate mark may be left on an outer surface of the resin molded part, the gate mark being a mark of a gate that is provided in a metal mold for pouring a molten resin into the metal mold at a time of molding of the resin molded part, and the gate mark may be positioned on the other end portion side of the electric wire relative to the sealing component. Accordingly, the molten resin can press the sealing component toward a front end portion of the connector housing when the resin molded part is being molded, so that it is possible to suppress displacement of the sealing component from the opening portion of the cavity toward the other end portion of the electric wire.

Fifth Aspect

In a fifth aspect, the wiring member according to the fourth aspect, a surface of the sealing component facing a front end portion of the connector housing may be in contact with the connector housing. Accordingly, even when the molten resin presses the sealing component toward the front end portion of the connector housing when the resin molded part is being molded, it is possible to regulate excessive movement of the sealing component toward the front end portion of the connector housing.

Sixth Aspect

In a sixth aspect, a manufacturing method of a wiring member in the present disclosure is a manufacturing method of a wiring member, including: a preparing step of, for a connector-equipped electric wire in which an end portion of an electric wire is housed in a cavity of a connector housing, providing the connector housing or the electric wire with a sealing component that at least partially closes off a gap between the connector housing and the electric wire in an opening portion of the cavity, and placing the connector-equipped electric wire and the sealing component in a metal mold; and a molding step of pouring a molten resin into the metal mold after the preparation step. Since the molding step is started with the sealing component closing off the gap between the connector housing and the electric wire in the opening portion of the cavity, it is easy to suppress intrusion of the resin into the cavity through the opening portion of the cavity in the molding step.

Seventh Aspect

In a seventh aspect, the manufacturing method of a wiring member according to the sixth aspect, in the molding step, an outer circumferential portion of the sealing component may be partially pressed by the metal mold. This suppresses displacement of the sealing component in the molding step.

Specific examples of a wiring member and a manufacturing method of the wiring member of the present disclosure will be described below with reference to the drawings. It should be noted that the present disclosure is not limited to the examples herein, but rather is indicated by the scope of claims, and is intended to include all modifications within a meaning and scope equivalent to the scope of claims.

First Embodiment

Figure 1:
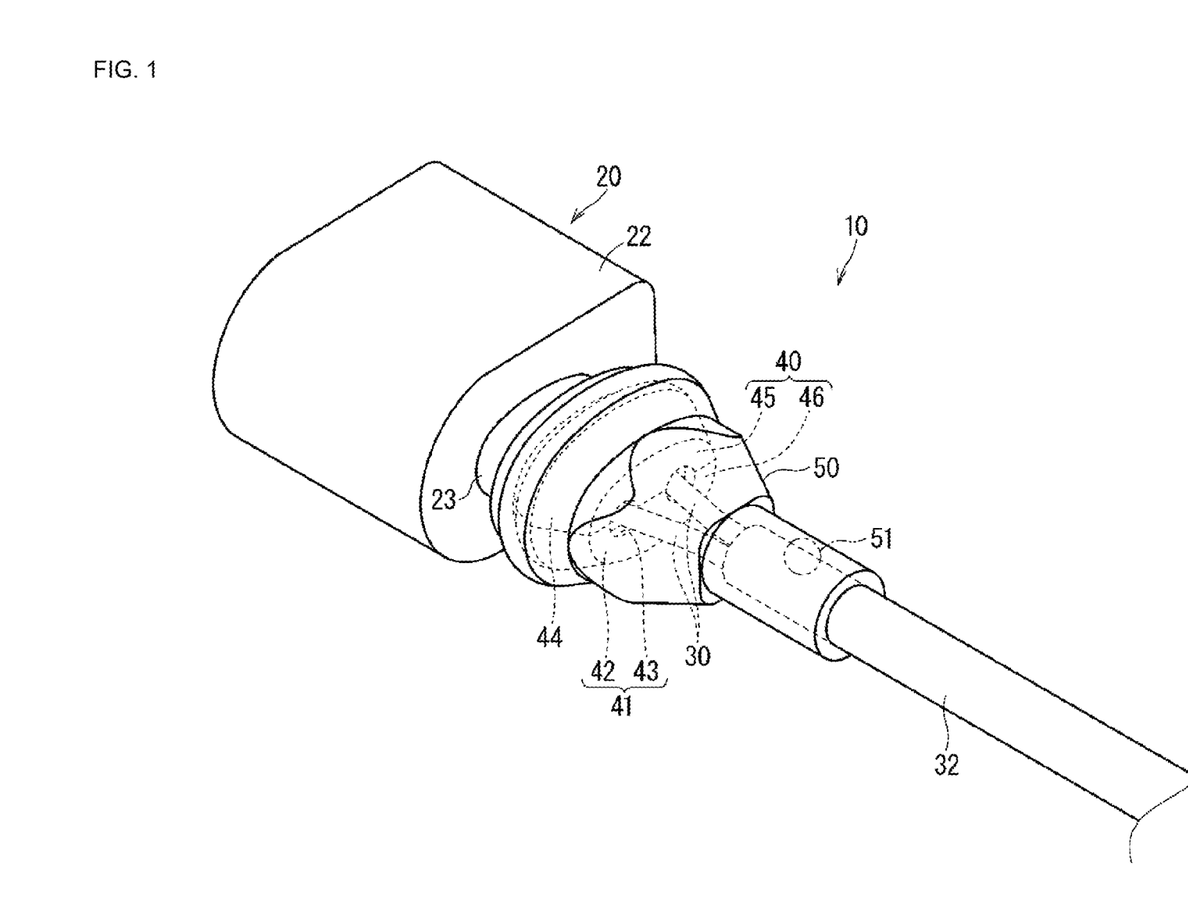
FIG. 1 is a perspective view of a wiring member according to a first embodiment.
Figure 2:
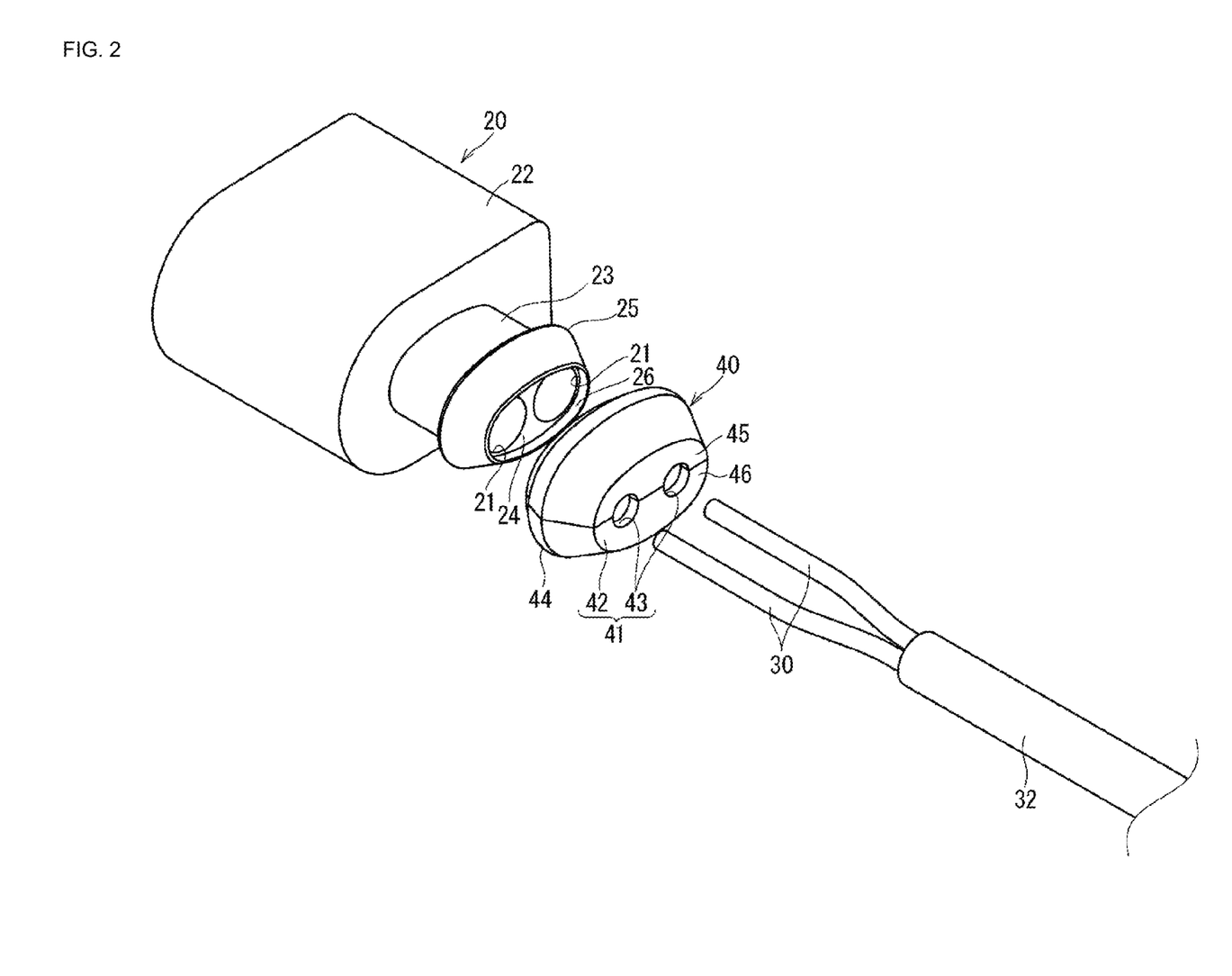
FIG. 2 is an exploded perspective view of the wiring member according to the first embodiment.

Hereinafter, a wiring member and a method for manufacturing the same according to a first embodiment will be described. FIG. 1 is a perspective view of a wiring member 10 according to a first embodiment. FIG. 2 is an exploded perspective view of the wiring member 10 according to the first embodiment. A resin molded part 50 and a terminal T are not shown in FIG. 2.

The wiring member 10 connects devices in a vehicle and transmits electricity or light. The wiring member 10 may be arranged anywhere in the vehicle. In this example, the wiring member 10 is described as a suspension wiring member that connects a device on the vehicle body side and a suspension device of the vehicle to each other. FIG. 1 shows a portion of the wiring member 10 that includes an end portion connected to a suspension device. The wiring member 10 includes a connector housing 20, electric wires 30, a sealing component 40, and the resin molded part 50.

Connector Housing

The connector housing 20 is provided with cavities 21. The number of cavities 21 corresponds to the number of electric wires 30 to be housed in the connector housing 20. In this example, since two electric wires 30 are housed in the connector housing 20, two cavities 21 are provided. In the present embodiment, the connector housing 20 has no vacant cavity, and the electric wires 30 are respectively housed in the cavities 21. In this example, the connector housing 20 includes a main body part 22 and an extension part 23.

The front end portion of the main body part 22 is a portion to be connected to a counterpart connection component (for example, a counterpart connector). The extension part 23 protrudes from the rear end portion of the main body part 22 toward the rear end side of the connector housing 20. The cavities 21 extend through the connector housing 20 from the extension part 23 to the main body part 22. One opening portions of the cavities 21 are formed in an end surface 24 of the extension part 23. The end portions of the electric wires 30 are inserted via the opening portions. In this example, the transverse cross section of the extension part 23 is formed in the shape of an ellipse (in this example, an oval). The ellipse-shaped transverse cross section is continuous in the axial direction of the cavities 21. Thus, the end surface 24 is also formed in the shape of an ellipse. On the ellipse-shaped end surface 24, the opening portions of the two cavities 21 are aligned in a long axis direction. The outer edge of the end surface 24 is positioned outside of the cavities 21 along the radial direction of the cavities 21, and the cavities 21 do not reach the outer edge of the end surface 24.

A bulging part 25 is provided around the extension part 23. The bulging part 25 is provided on the outer circumferential portion of the leading end portion on the end surface 24 side of the extension part 23. The leading end portion of the extension part 23 provided with the bulging part 25 is thicker than the base end portion of the extension part 23 not provided with the bulging part 25. The outer surface of the bulging part 25 is tapered toward the end surface 24. The bulging part 25 is formed in the shape of a frustum. At the extension part 23, there is a step between the leading end portion provided with the bulging part 25 and the base end portion not provided with the bulging part 25.

The connector housing 20 has a hood part 26 protruding rearward past the end surface 24. The outer surface of the hood part 26 is continuously tapered from the bulging part 25. The outer surface of a pointed end of the hood part 26 is formed in the shape of an ellipse that is smaller than the outer surface of the base end portion of the extension part 23 not provided with the bulging part 25 (see FIG. 4). The inner surface of the hood part 26 is formed in the shape of an ellipse that is smaller than the outer surface of the base end portion of the extension part 23 not provided with the bulging part 25. The inner surface of the hood part 26 is continuous with a uniform size along the axial direction of the cavities 21.

Electric Wire

One end portion of each electric wire 30 is housed in the corresponding cavity 21. The other end portion of each electric wire 30 extends outward from the opening portion of the corresponding cavity 21. In this example, two electric wires 30 are housed in the connector housing 20. The number of electric wires 30 housed in one connector housing 20 is not limited to two and may be one or three or more.

Each electric wire 30 is a coated electric wire including a core wire and a coating. The core wire is a linear member formed by a metallic wire made of copper, a copper alloy, aluminum, an aluminum alloy, or the like. The core wire may be a single wire or a twisted wire in which a plurality of wire strands are twisted together. The coating is an insulating portion that surrounds the core wire. The coating is formed by extruding a resin around the core wire, for example.

In this example, a sheath 32 is provided around the two electric wires 30. The two electric wires 30 are bundled by the sheath 32. The sheath 32 is formed by extrusion-molding a resin onto the electric wires 30, for example. The end portions of the electric wires 30 extend from the end portion of the sheath 32 and are housed in the connector housing 20. An end portion of the sheath 32 is located at a position separated from the connector housing 20 along the longitudinal direction of the electric wires 30.

A terminal T is provided at the leading end portion of each electric wire 30. The terminal T is connected to the electric wire 30 through, crimping, pressure welding, welding, or the like. The terminal T and a portion of the electric wire 30 connected to the terminal T are housed in the corresponding cavity 21. When each electric wire 30 is inserted to a predetermined position, the coating is positioned at the opening portion of the corresponding cavity 21. The opening portion of each cavity 21 is formed to be larger than the electric wire 30 to facilitate insertion of the terminal T. Thus, the gap between the coating and the inner surface of the cavity 21 in the opening portion of the cavity 21 is large. In the example shown in FIG. 2, the opening portions of the cavities 21 have a circular shape, but the opening portions of the cavities 21 may have a square shape or the like.

Sealing Component

Figure 3:
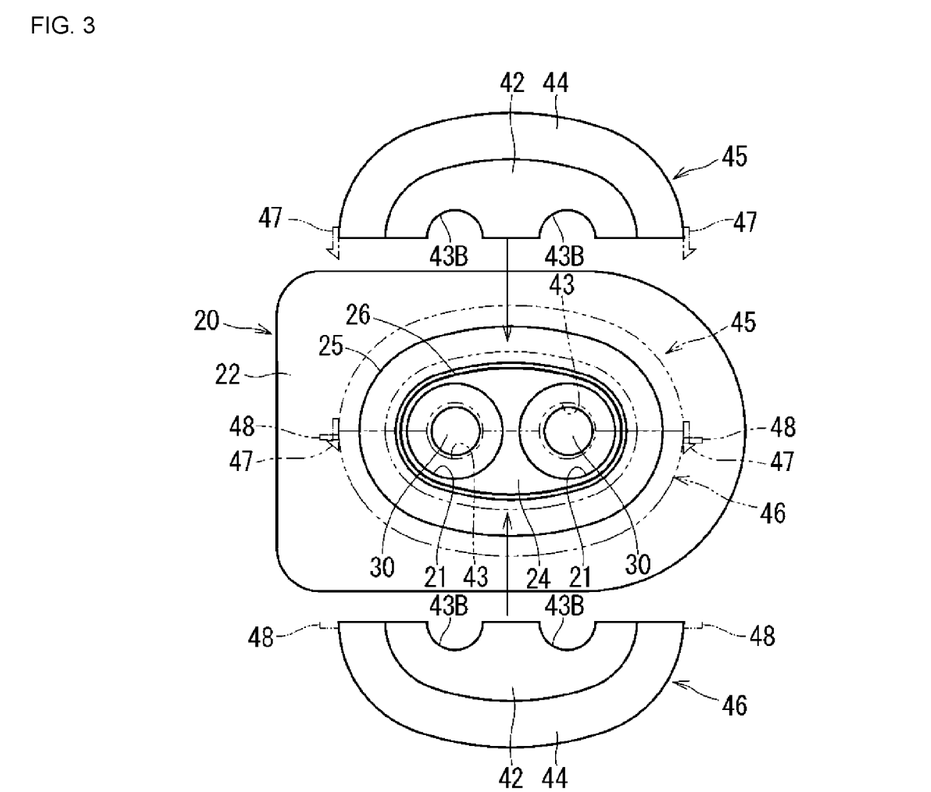
FIG. 3 is a descriptive diagram illustrating how a sealing component is attached.
Figure 4:
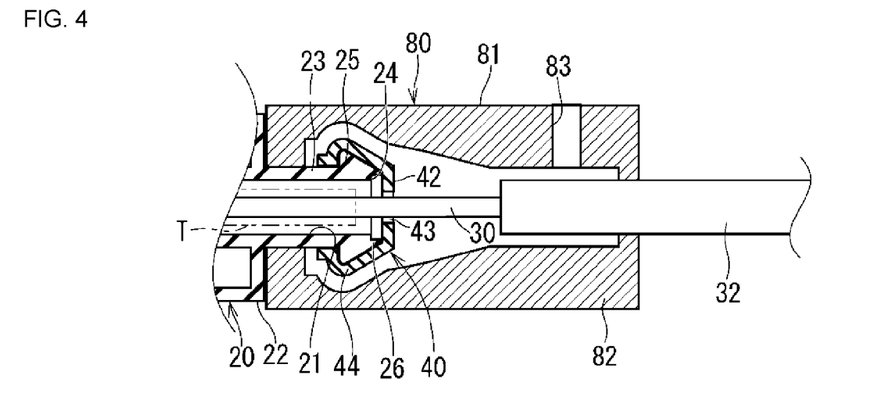
FIG. 4 is a descriptive diagram illustrating how a resin molded part is molded.

The sealing component 40 will be described in detail with reference to FIGS. 3 and 4 in addition to FIGS. 1 and 2. FIG. 3 is a descriptive diagram illustrating how the sealing component 40 is attached. FIG. 4 is a descriptive diagram illustrating how the resin molded part 50 is molded.

The sealing component 40 is attached to the connector housing 20 or the electric wires 30. The sealing component 40 at least partially closes off the gaps between the connector housing 20 and the electric wires 30 in the opening portions of the cavities 21. In this example, the sealing component 40 is not formed by performing insert molding with the connector housing 20 and the electric wires 30 serving as inserts, but is formed by attaching a molded article that has been molded separate from the connector housing 20 and the electric wires 30. One sealing component 40 reduces the gaps between the plurality of electric wires 30 and the connector housing 20. Naturally, separate sealing components may be provided for each electric wire 30. The sealing component 40 includes an insertion part 41 and a fitting part 44.

The insertion part 41 is a part in which a plate-like part 42 is provided with holes 43 through which the electric wires 30 are passed. The plate-like part 42 is formed to be larger than the cavities 21. The plate-like part 42 is preferably formed so as to be as large or larger than the end surface 24 provided with the cavities 21. The plate-like part 42 is positioned on the other end portion side of the electric wires 30 relative to the opening portions of the cavities 21. Accordingly, the opening portions of the holes 43 are positioned on the other end side relative to the opening portions of the cavities 21, and thus, even if resin intrudes into the holes 43, the resin is unlikely to reach the cavities 21.

The holes 43 are formed to be smaller than the cavities 21. This allows the plate-like part 42 to at least partially closes off gaps between the connector housing 20 and the electric wires 30 in the opening portions of the cavities 21. The holes 43 are formed in a circular shape larger than the electric wires 30. Accordingly, even if the sealing component 40 and the electric wires 30 are in partial intimate contact with each other in the circumferential direction they are not fully in intimate contact with each other in the circumferential direction, and there are gaps between the sealing component 40 and the electric wires 30. In addition, the sealing component 40 does not sandwich the electric wires 30 at two opposite points along the circumferential direction of the electric wires 30. A configuration is possible where the holes 43 are equal in size or smaller than the electric wires 30, and the sealing component 40 and the electric wires 30 are in intimate contact with each other in the circumferential direction or the sealing component 40 sandwiches the electric wires 30 at two opposite points along the circumferential direction.

In this example, the plate-like part 42 is formed to be larger than the hood part 26. The plate-like part 42 is disposed on the other end portion side of the electric wires 30 relative to the hood part 26. This creates a gap between the plate-like part 42 and the end surface 24, and the hood part 26 functions as a resin retainer. That is, even if resin intrudes through the holes 43 while the resin molded part 50 is being molded, the resin can be temporarily retained in the hood part 26. The end surface 24 is formed in the shape of an ellipse and the outer edge of a portion between the two cavities 21 protrudes toward the outer circumferential side. Thus, resin retained in the hood part 26 is unlikely to reach the opening portions of the cavities 21.

The fitting part 44 is a part that extends from the insertion part 41 toward the connector housing 20. The fitting part 44 is fitted to the extension part 23 of the connector housing 20. The fitting part 44 extends from the outer edge portion of the plate-like part 42, over the bulging part 25, and to the base end portion of the extension part 23 not provided with the bulging part 25. The base end portion of the fitting part 44 on the plate-like part 42 side increases in diameter as the distance from the plate-like part 42 increases. The leading end portion of the fitting part 44 decreases in diameter as the distance from the plate-like part 42 increases. The opening portion of the fitting part 44 is formed to be smaller than the bulging part 25 and is caught on the step formed by providing the bulging part 25 on the extension part 23.

A surface of the sealing component 40 facing the front end portion of the connector housing 20 comes into contact with the connector housing 20. In this example, a surface of the plate-like part 42 facing the front end portion of the connector housing 20 comes into contact with the end surface of the hood part 26. In this example, the sealing component 40 is positioned outside the cavities 21. That is, the sealing component 40 does not include portions inserted into the cavities 21.

In this example, the sealing component 40 includes a first member 45 and a second member 46. The first member 45 and the second member 46 are formed in two semi-tubular shapes with which the insertion part 41 and the fitting part 44 are separated into two. The first member 45 and the second member 46 each have grooves 43B. The grooves 43B in the first member 45 and the grooves 43B in the second member 46 are matched to each other to form the holes 43. The first member 45 covers the electric wires 30 from one side. The second member 46 covers the electric wires 30 from the other side. The first member 45 and the second member 46 are attached from a direction orthogonal to the direction in which the electric wires 30 are arranged in parallel. The first member 45 and the second member 46 are formed in semi-tubular shapes of the same size. The first member 45 and the second member 46 are each formed in a shape taken along a plane that connects the centers of the two holes 43 of the insertion part 41 and is parallel to the axial direction of the holes 43. The first member 45 and the second member 46 may be formed in semi-tubular shapes of different sizes.

The first member 45 and the second member 46 are separate members and can be attached and detached from each other before the resin molded part 50 is provided. As shown in FIG. 3, the sealing component 40 is preferably provided with male engagement parts 47 and female engagement parts 48. The male engagement parts 47 and the female engagement parts 48 maintain the attachment state of the first member 45 and the second member 46 surrounding the electric wires 30. The male engagement parts 47 are formed as protrusions, and the female engagement parts 48 are formed as holes into which the male engagement parts 47 are respectively insertable. When the male engagement parts 47 are inserted into the corresponding female engagement parts 48, the male engagement parts 47 are partially engaged with the circumferential edges of the holes in the female engagement parts 48.

In the example shown in FIG. 3, the male engagement parts 47 are provided on two sides of the fitting part 44 of the first member 45, and the female engagement parts 48 are provided on two sides of the fitting part 44 of the second member 46. The male engagement parts 47 may be provided on one side of the fitting part 44 of the first member 45 and on the other side of the fitting part 44 of the second member 46, and the female engagement parts 48 may be provided on one side of the fitting part 44 of the second member 46 and on the other side of the fitting part 44 of the first member 45. In this case, the first member 45 and the second member 46 are in rotational symmetry and can be identical members. This reduces the number of kinds of components.

The resin material of the sealing component 40 may be any resin material. However, the resin material is preferably capable of adhering to the resin of the resin molded part 50 when the resin molded part 50 is being molded.

Resin Molded Part

The resin molded part 50 covers a portion extending from the rear end portion of the connector housing 20 to a position of an intermediate portion of the electric wires 30 on the other end portion side relative to the portion provided with the sealing component 40. In this example, one end portion of the resin molded part 50 covers the extension part 23. The other end portion of the resin molded part 50 covers the sheath 32. The shape of the outer surface of the resin molded part 50 may be any shape. In this example, the outer surface of the portion of the resin molded part 50 covering the sheath 32 is formed in a circular shape that corresponds to the outer surface of the sheath 32. The outer surface of the portion of the resin molded part 50 covering the electric wires 30 extending from the end portion of the sheath 32 is formed in the shape of a truncated square pyramid. The outer surface of the portion of the resin molded part 50 covering the sealing component 40 is formed in the shape of an ellipse that corresponds to the outer surface of the sealing component 40.

The resin molded part 50 is formed by performing injection molding (insert molding) using a metal mold 80. At this time, the connector housing 20, the electric wires 30, and the sealing component 40 act as insert components.

The metal mold 80 includes an upper mold 81 and a lower mold 82. The connector housing 20 and the electric wires 30 are partially drawn out from between the upper mold 81 and the lower mold 82. The metal mold 80 is provided with a gate 83. The gate 83 is a portion for pouring a molten resin into the metal mold 80 when molding the resin molded part 50. There are cases where a gate mark 51, which is a mark of the gate 83, is left on the outer surface of the resin molded part 50. The gate mark 51 is a mark caused by cutting resin remaining at the position of the gate 83 once molding of the resin molded part 50 is complete, for example.

As shown in FIG. 4, in the metal mold 80, the gate 83 is positioned on the other end portion side of the electric wires 30 relative to the sealing component 40. Accordingly, the gate mark 51 is positioned on the other end portion side of the electric wires 30 relative to the sealing component 40. In this example, the gate mark 51 is positioned one the other end portion side of the electric wires 30 relative to the end portion of the sheath 32. The gate mark 51 is provided on the outer surface of the portion of the resin molded part 50 covering the sheath 32.

The resin material of the resin molded part 50 may be any resin material, and polyurethane may be used, for example. In the case of using polyurethane as the resin material for the resin molded part 50, the resin material for the sealing component 40 is preferably polyurethane or nylon.

Manufacturing Method

Next, a method for manufacturing the wiring member 10 will be described. The manufacturing method of the wiring member 10 includes a preparation step and a molding step.

The preparation step is a step of, for connector-equipped electric wires in which end portions of the electric wires 30 are housed in the cavities 21 of the connector housing 20, providing the connector housing 20 or the electric wires 30 with the sealing component 40 that at least partially closes off the gaps between the connector housing 20 and the electric wires 30 in the opening portions of the cavities 21, and placing the connector-equipped electric wires and the sealing component 40 in the metal mold 80. In the sealing component 40, the first member 45 and the second member 46 are overlaid onto the extension part 23 and the electric wires 30, and the male engagement parts 47 and the female engagement parts 48 are engaged with each other. Portions of the electric wires 30 and the connector housing 20 fall within the metal mold 80. The other end portions of the electric wires 30 and the main body part 22 of the connector housing 20 are drawn out from the metal mold 80 via a drawing part provided between the upper mold 81 and the lower mold 82. The entirety of the sealing component 40 falls within the metal mold 80. FIG. 4 shows completion of the preparation step.

The molding step is a step of pouring a molten resin into the metal mold 80 after the preparation step. After filling the molten resin into the metal mold 80, the molten resin solidifies to provide the resin molded part 50 whose outer surface has a shape that corresponds to the shape of the inner surface of the metal mold 80, whereby the wiring member 10 is manufactured. The molten resin poured into the metal mold 80 via the gate 83 flows from the side on which the sheath 32 is provided toward the connector housing 20. At this time, since the opening portions of the cavities 21 are at least partially closed off by the sealing component 40, the molten resin is unlikely to reach the opening portions of the cavities 21. Even if the molten resin does enter the holes 43 of the sealing component 40, the holes 43 and the opening portions of the cavities 21 are separated from each other and also the resin retainer is provided by the hood part 26 therebetween, and thus the molten resin is unlikely to reach the opening portions of the cavities 21.

The sealing component 40 is pressed by the molten resin toward the connector housing 20. At this time, the plate-like part 42 comes into contact with the hood part 26 that then regulates movement of the sealing component 40 toward the connector housing 20.

Advantageous Effects of First Embodiment

According to the wiring member 10 configured as described above, the provision of the resin molded part 50 makes it possible to water-seal the opening portions of the cavities 21 and the end portion of the sheath 32. At this time, since the sealing component 40 at least partially closes off the gaps between the connector housing 20 and the electric wires 30 in the opening portions of the cavities 21, it is easy to suppress the intrusion of a resin into the cavities 21 via the opening portions of the cavities 21 when molding the resin molded part 50.

The sealing component 40 also includes the semi-tubular first member 45 that covers the electric wires 30 from one side and the semi-tubular second member 46 that covers the electric wires 30 from the other side. Accordingly, the sealing component 40 can be attached to the electric wires 30 from lateral sides, thus facilitating attachment of the sealing component 40 to the electric wire 30.

Since the holes 43 in the insertion part 41 of the sealing component 40 are formed to be smaller than the cavities 21, the resin is unlikely to intrude into a space between the holes 43 and the electric wires 30. In addition, since the plate-like part 42 of the insertion part 41 of the sealing component 40 is formed to be larger than the cavities 21 and positioned on the other end side of the electric wires 30 relative to the opening portions of the cavities 21, the entrances to the holes 43 are distanced from the opening portions of the cavities 21. Accordingly, even if resin moves between the holes 43 and the electric wires 30, the resin is unlikely to reach the cavities 21.

The gate mark 51 is positioned one the other end portion side of the electric wires 30 relative to the sealing component 40. Accordingly, the molten resin can press the sealing component 40 toward the front end portion of the connector housing 20 when the resin molded part 50 is being molded, and it is the sealing component 40 is kept from being displaced from the opening portions of the cavities 21 toward the other end portion side of the electric wires 30.

The surface of the sealing component 40 facing the front end portion of the connector housing 20 comes into contact with the connector housing 20. Accordingly, even when the molten resin presses the sealing component 40 toward the front end portion of the connector housing 20 when the resin molded part 50 is being molded, it is possible to regulate excessive movement of the sealing component 40 toward the front end portion of the connector housing 20.

According to the manufacturing method of the wiring member 10, the molding step is started in the state where the sealing component 40 at least partially closes off the gaps between the connector housing 20 and the electric wires 30 in the opening portions of the cavities 21, and thus it is easy to suppress intrusion of the resin into the cavities 21 via the opening portions of the cavities 21 in the molding step.

Second Embodiment

Figure 5:
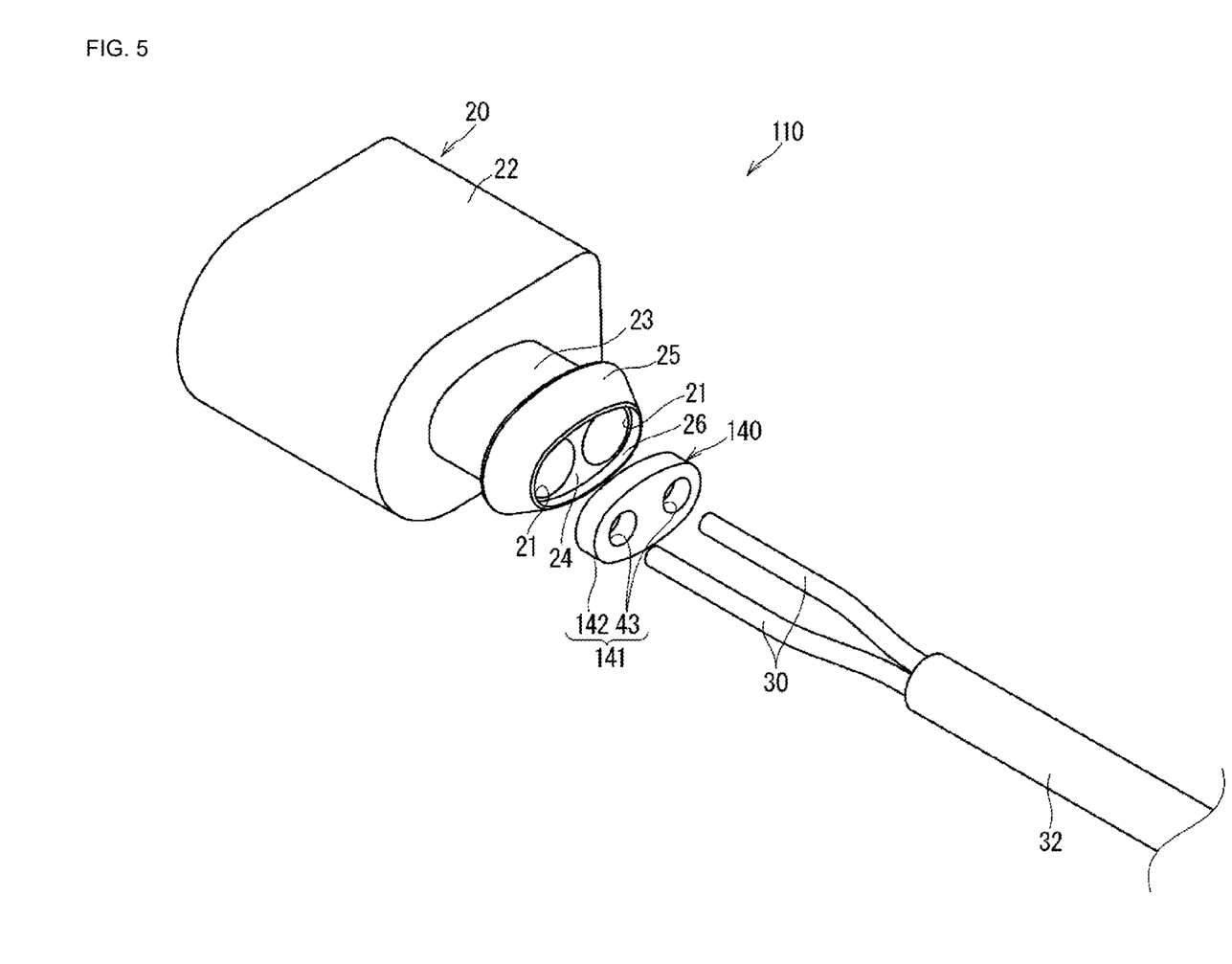
FIG. 5 is an exploded perspective view of a wiring member according to a second embodiment.
Figure 6:
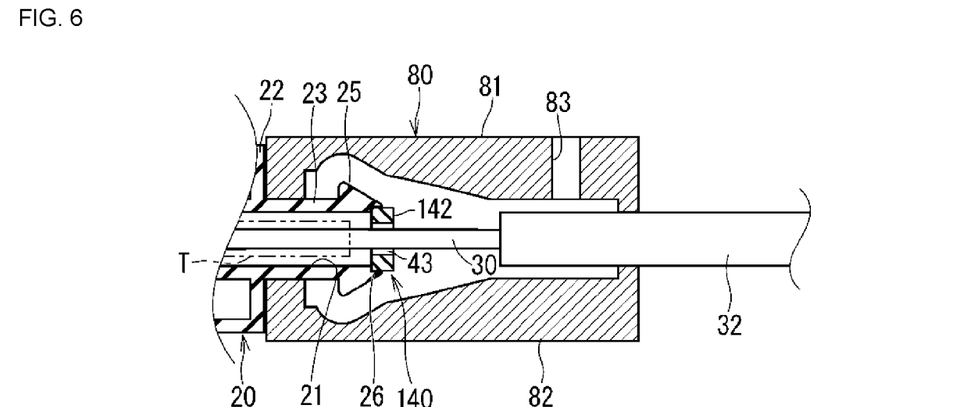
FIG. 6 is a descriptive diagram illustrating how a resin molded part is molded.

A wiring member according to a second embodiment will be described. FIG. 5 is an exploded perspective view of a wiring member 110 according to the second embodiment. Similarly to FIG. 2, a resin molded part 50 and terminals T are not shown in FIG. 5. FIG. 6 is a descriptive diagram illustrating how the resin molded part 50 is molded using a sealing component 140. In the description of the present embodiment, constituent elements similar to those described above are given identical reference signs and description thereof will be omitted.

In the wiring member 110 of the present example, the sealing component 140 differs in configuration from the sealing component 40 in the wiring member 10. The sealing component 140 is not divided into the first member 45 and the second member 46. Accordingly, the sealing component 140 is not attached to the electric wires 30 from lateral sides but is attached to the electric wires 30 by passing the electric wires 30 through the holes 43. The electric wires 30 are preferably passed through the sealing component 140 before end portions of the electric wires 30 are housed in the connector housing 20. The electric wires 30 are preferably passed through the sealing component 140 before the terminals T are provided at the end portions of the electric wires 30.

The sealing component 140 includes an insertion part 141 but is different from the sealing component 40 in that the sealing component 140 is formed in a shape without the fitting part 44. Since the fitting part 44 is not provided, the sealing component 140 is not attached to the connector housing 20 but is attached to the electric wires 30. The outer surface of a plate-like part 142 of the insertion part 141 is formed in a size equal to or smaller than the inner surface of a hood part 26. Accordingly, the insertion part 141 can fall within the hood part 26. The insertion part 141 may be formed to be larger than the hood part 26 and be caught on the outer side of the hood part 26 in a similar fashion to the insertion part 41. The outer surface of the plate-like part 142 is formed to be larger than the cavities 21 so that the plate-like part 142 is caught on the end surface 24 and does not enter the cavities 21.

The length of the plate-like part 142 along the axial direction of the holes 43 is larger than the protrusion length of the hood part 26 from the end surface 24. Accordingly, a portion of the plate-like part 142 on the other end portion side of the electric wires 30 protrudes outward from the hood part 26. The length of the plate-like part 142 along the axial direction of the holes 43 may be equal to or smaller than the protrusion length of the hood part 26 from the end surface 24.

Modification Examples

Figure 7:
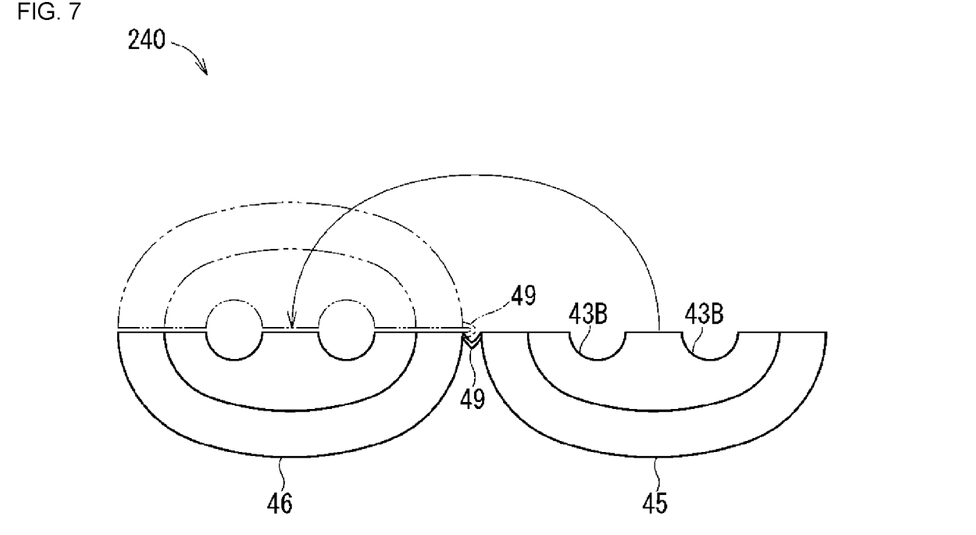
FIG. 7 is a front view of a modification example of a sealing component.
Figure 8:
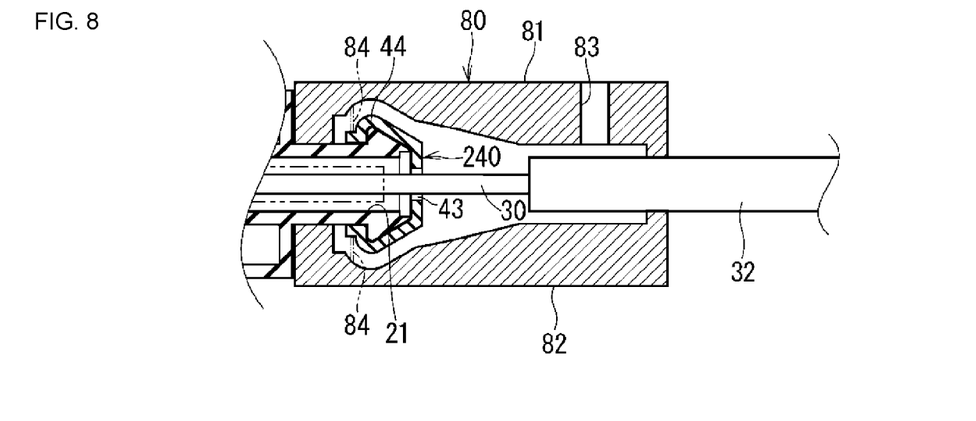
FIG. 8 is a descriptive diagram illustrating how a resin molded part is molded using a sealing component according to the modification example.

FIG. 7 is a front view of a modification example of the sealing component 40. FIG. 8 is a descriptive diagram illustrating how the resin molded part 50 is molded using a sealing component 240 according to the modification example.

The sealing component 240 according to the modification example differs from the sealing component 40 in that the first member 45 and the second member 46 are connected together via a hinge part 49 in an openable and closable manner. The hinge part 49 is a thin part. The first member 45 and the second member 46 are capable of pivoting at the position of the hinge part 49.

The sealing component 240 also differs from the sealing component 40 in that the male engagement parts 47 and the female engagement parts 48 are not provided. In this case, in the molding step, a portion of the outer circumferential part of the sealing component 240 is pressed by a metal mold 280. Accordingly, even if the sealing component 240 includes the first member 45 and the second member 46 but does not include the male engagement parts 47 and the female engagement parts 48, it is possible to suppress opening or displacement of the sealing component 240 in the longitudinal direction of the electric wires 30 in the molding step.

For example, the metal mold 280 includes a pin 84 that press the first member 45 and a pin 84 that press the second member 46. When molding the resin molded part 50, the first member 45 and the second member 46 are pressed and held down by the pins 84. The pins 84 may be provided on an upper mold 81 and a lower mold 82. The pins 84 may be provided separately from the upper mold 81 and the lower mold 82, and the upper mold 81 and the lower mold 82 may have holes through which the pin 84 are to be passed. The wiring member manufactured as described above may have a mark as a result of being pressed by the metal mold 280 (the pins 84). For example, in the molding step, the resin molded part 50 may not be provided at the portions through which the pins 84 are to be passed and the sealing component 240 may be exposed. That is, the resin molded part 50 may be provided with holes that reach the first member 45 and the second member 46 of the sealing component 240 from the outer surface thereof.

Any portion of the sealing component 240 may be pressed by the pins 84. In the example shown in FIG. 8, the pins 84 press a portion of the fitting part 44 of the sealing component 240 covering the base end portion (not provided with the bulging part 25) of the extension part 23. Otherwise, the portion of the sealing component 240 covering the bulging part 25 in the fitting part 44 may be pressed by the pins 84 or the insertion part 41 may be pressed by the pins 84.

Figure 9:
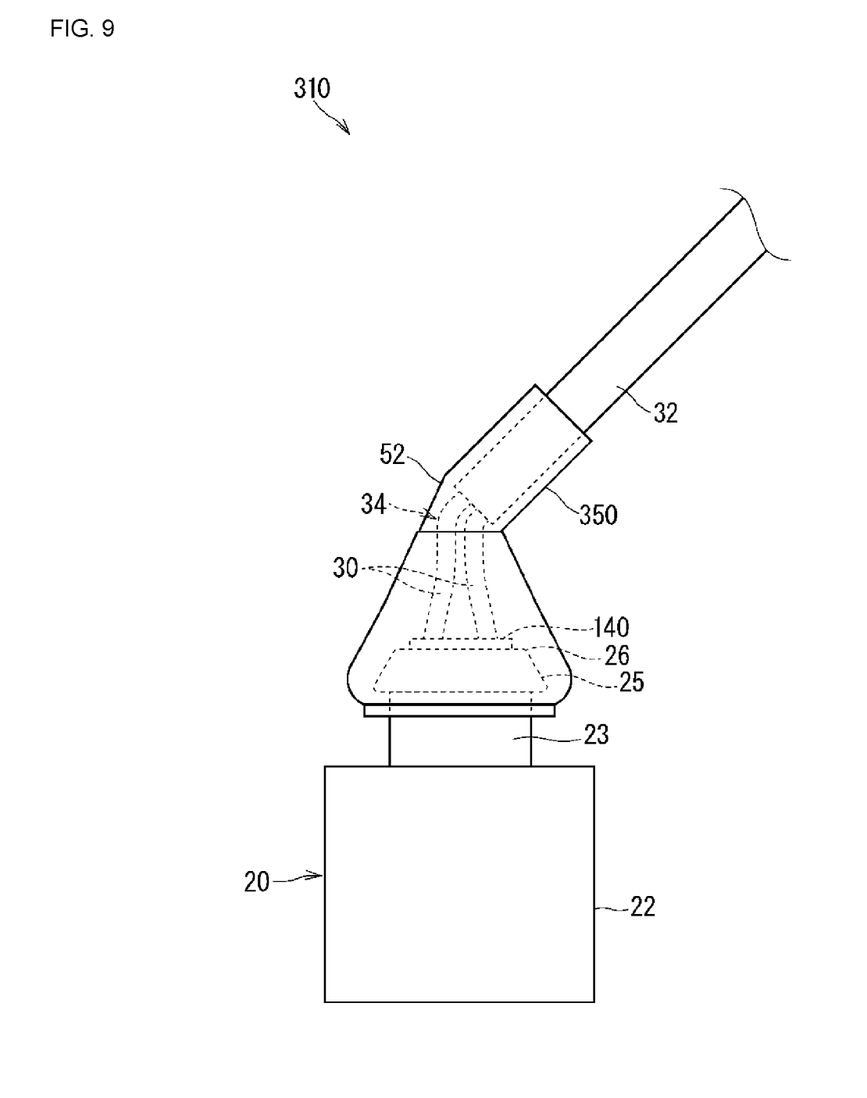
FIG. 9 is a plan view of a modification example of the wiring member.

FIG. 9 is a plan view of a modification example of a wiring member 310. In the wiring member 310 according to the modification example shown in FIG. 9, electric wires 30 include bending parts 34. The bent parts 34 are positioned inside a resin molded part 350. The resin molded part 350 regulates a path of the electric wires 30 in a state in which the electric wires 30 are bent. A portion of the resin molded part 350 covering the bent parts 34 constitutes a bend regulating part 52. The electric wires 30 extend from the connector housing 20 along a first direction that is an axial direction of the cavities 21. The electric wires 30 are bent at the bent parts 34 that are located inside the resin molded part 350. The other end sides of the electric wires 30 past the bent parts 34 extend along a second direction that intersects the first direction.

The second direction may be any direction. In the example shown in FIG. 9, the two electric wires 30 are bent in a planar fashion. That is, of the two electric wires 30, portions extending in the first direction and portions extending in the second direction are bent around an axis extending along a direction orthogonal to both the longitudinal direction and the parallel arrangement direction (an axis extending in a direction vertical to the sheet plane of FIG. 9). However, the two electric wires 30 may be bent in any direction. For example, the two electric wires 30 may be bent three-dimensionally. For example, of the two electric wires 30, portions extending in the first direction and portions extending in the second direction may be bent around an axis parallel to the parallel arrangement direction (an axis extending in a direction parallel to the sheet plane of FIG. 9).

The angle of the bent parts 34 (the angle formed by the first direction and the second direction) may be any angle. In the example shown in FIG. 9, the angle of the bent parts 34 is 45 degrees, but the angle may be smaller or larger than 45 degrees.

In the example shown in FIG. 9, the bent parts 34 are provided at portions of the electric wires 30 that extend out from the sheath 32. Thus, the sheath 32 is not bent. However, the bent parts 34 may be provided at portions of the electric wires 30 that are covered by the sheath 32. In this case, the sheath 32 is also bent together with the electric wires 30 at the bent parts 34.

Furthermore, it has been described above that the connector housing 20 is provided with the hood part 26. However, this is not an essential configuration. The connector housing 20 does not necessarily need to be provided with the hood part 26. In this case, the insertion part 41 may come in contact with the end surface 24. In addition, it has been described above that the connector housing 20 is provided with the bulging part 25. However, this is not an essential configuration. The connector housing 20 does not necessarily need to be provided with the bulging part 25. In this case, similar to the sealing component 40, the sealing component 40 may be able to move toward the other end portions of the electric wires 30 before the molding step. It has been described above that the connector housing 20 is provided with the extension part 23. However, this is not an essential configuration. The connector housing 20 does not necessarily need to be provided with the extension part 23. In this case, the resin molded part 50 may be formed so as to cover the rear end portion of the main body part 22.

It has been described above that the sealing component 40 includes the insertion part 41 in which the holes 43, through which the electric wires 30 are passed, are formed in the plate-like part 42. However, this is not an essential configuration. The sealing component 40 may include a comb-like insertion part in which grooves, through which the electric wires 30 are passed, are formed in the plate-like part 42. For example, a member corresponding to the first member 45 or the second member 46 formed by dividing the sealing component 140 of the second embodiment into two may be used alone as a sealing component. In this case, the grooves in the insertion part are preferably formed to be larger than a semi-circle so that the grooves can surround the periphery of the electric wires 30 in a range exceeding 180 degrees. Two sealing components each including a comb-like insertion part may be attached to the electric wires 30. The two sealing components each including a comb-like insertion part may be attached to the electric wires 30 at positions shifted along the longitudinal direction of the electric wires 30 and in mutually opposite directions with respect to the electric wires 30.

It has been described above that the gate 83 of the metal mold 80 is positioned on the other end portion side of the electric wires 30 relative to the sealing component 40. However, this is not an essential configuration. In the metal mold, the gate may be located at the same position as the sealing component 40 or closer to the one end portions of the electric wires 30. In this case, the gate mark on the resin molded part may also be provided at a position corresponding to the position of the gate.

It has been described above that the surface of the sealing component 40 facing the connector housing 20 is in contact with the connector housing 20. However, this is not an essential configuration. The surface of the sealing component 40 facing the connector housing 20 does not necessarily need to come into contact with the connector housing 20.

The configurations described above in relation to the embodiments and the modification examples can be combined as appropriate provided no contradiction arises. For example, the sealing component 40 in the first embodiment does not necessarily need to be divided into the first member 45 and the second member 46, as is the case with the sealing component 40 in the second embodiment. In this case, the extension part 23 is preferably inserted into the fitting part 44 from the end surface 24 side. At this time, the opening part of the fitting part 44 is preferably elastically deformable so as to spread toward the outer circumferential side in order to allow passage of the bulging part 25. In this case, the outer surface of the bulging part 25 is tapered, and the outer surface of the hood part 26 is formed to be smaller than the opening part of the fitting part 44. Accordingly, after the inner surface of the opening portion of the fitting part 44 has come into contact with the outer surface of the hood part 26, with the fitting part 44 inserted in this state, the fitting part 44 can easily elastically deform such that the opening portion of the fitting part 44 gradually widens. For example, the sealing component 40 not provided with the fitting part 44 in the second embodiment may be divided into the first member 45 and the second member 46, similarly to the sealing component 40 in the first embodiment.

The invention claimed is:

1. A wiring member comprising:
   a connector housing provided with a cavity;
   an electric wire in which one end portion is housed in the cavity and the other end portion extends outward from an opening portion of the cavity;
   a sealing component that is attached to the connector housing or the electric wire to at least partially close off a gap between the connector housing and the electric wire in the opening portion of the cavity, wherein the sealing component includes a semi-tubular first member that covers the electric wire from one side and a semi-tubular second member that covers the electric wire from another side; and
   a resin molded part that covers a portion extending from a rear end portion of the connector housing to a position of an intermediate portion of the electric wire on the other end portion side relative to a portion provided with the sealing component; and
   wherein the sealing component includes an insertion part provided with a hole in a plate-like part through which the electric wire is passed,
   the hole is formed to be smaller than the cavity, and
   the plate-like part is formed to be larger than the cavity and positioned on the other end portion side of the electric wire relative to the opening portion of the cavity.

2. The wiring member according to claim 1,
   wherein a gate mark is left on an outer surface of the resin molded part, the gate mark being a mark of a gate that is provided in a metal mold for pouring a molten resin into the metal mold at a time of molding of the resin molded part, and
   the gate mark is positioned on the other end portion side of the electric wire relative to the sealing component.

3. The wiring member according to claim 1,
   wherein a gate mark is left on an outer surface of the resin molded part, the gate mark being a mark of a gate that is provided in a metal mold for pouring a molten resin into the metal mold at a time of molding of the resin molded part, and
   the gate mark is positioned on the other end portion side of the electric wire relative to the sealing component.

4. The wiring member according to claim 3,
   wherein a surface of the sealing component facing a front end portion of the connector housing is in contact with the connector housing.

5. A manufacturing method of a wiring member, comprising:
   a preparing step of, for a connector-equipped electric wire in which an end portion of an electric wire is housed in a cavity of a connector housing, providing the connector housing or the electric wire with a sealing component that at least partially closes off a gap between the connector housing and the electric wire in an opening portion of the cavity, and placing the connector-equipped electric wire and the sealing component in a metal mold; and
   a molding step of pouring a molten resin into the metal mold after the preparation step wherein, in the molding step, an outer circumferential portion of the sealing component is partially pressed by the metal mold.

\* \* \* \* \*